United States Patent [19]

Warren

[11] 4,012,162

[45] Mar. 15, 1977

[54] ALL PURPOSE MAGNETIC BASE DRILL

[76] Inventor: Wesley S. Warren, 4298 Chimney Pointe Drive, Bloomfield Hills, Mich. 48013

[22] Filed: Feb. 10, 1975

[21] Appl. No.: 548,423

[52] U.S. Cl. .................................... 408/76; 408/87

[51] Int. Cl.[2] .......................................... B23B 45/14

[58] Field of Search .............. 408/76, 87, 712, 135, 408/234, 110, 91, 72; 403/155, 356

[56] References Cited

UNITED STATES PATENTS

| | | | |
|---|---|---|---|
| 1,554,475 | 9/1925 | Wendell et al. .................... | 403/155 |
| 1,794,149 | 2/1931 | Collins .............................. | 408/135 |
| 2,821,875 | 2/1958 | Buck .................................. | 408/76 |

FOREIGN PATENTS OR APPLICATIONS

| | | | |
|---|---|---|---|
| 811,458 | 4/1959 | United Kingdom ................. | 408/76 |

*Primary Examiner*—Othell M. Simpson
*Assistant Examiner*—Z. R. Bilinsky
*Attorney, Agent, or Firm*—Harness, Dickey & Pierce

[57] ABSTRACT

An all-purpose drilling unit is provided which has a cylindrical base of magnetizable material containing a recess for a coil and an aperture for a cylindrical column which is supported in upright position thereby. A motor bracket is mounted on the column over a rack which is supported on one side thereof on which the bracket is moved upwardly and downwardly relative to the column. A transverse shaft is provided on the motor bracket having a pinion, the teeth of which are in mesh with those of the rack. A hub on one end of the shaft contains a plurality of rods and operating handles by which the motor and bracket is moved upwardly and downwardly on the column. A portable drill is supported on the motor bracket and is offset to permit the bracket to move downwardly beyond the top of the supporting base. A cylindrical sleeve is mounted above the cylindrical base forming a compartment containing a power pack, a receptacle, a switch, a plug, a light, a diode and interconnecting elements above the base. A disk-like cover encloses the top of the sleeve and supports the switch, light and receptacle.

2 Claims, 5 Drawing Figures

ALL PURPOSE MAGNETIC BASE DRILL

BACKGROUND OF THE INVENTION

Magnetic base drills have been employed heretofore in the art and such drills are disclosed in the following patents:

| | |
|---|---|
| Stroner et al | 1,010,975 |
| W. S. Warren | 3,371,257 |
| Buck Reissue | 24,203 |
| Great Britain | 583,158 |
| French | 369,374 |

SUMMARY OF THE INVENTION

The invention pertains to a simple portable drill of the magnetic base type which may be employed on magnetic material which requires drilling or which may be otherwise mounted including the provision of a small magnetic plate on which the drill may be secured and the work drilled thereon. The drill embodies a base for a coil which may be of any shape but which is preferably circular having a circular coil therein for magnetizing the material of the base and cause it to adhere to magnetic material. A cylindrical column is mounted in a central aperture in the base by having a shoulder end extending in a central aperture and provided with an annular groove near the bottom which receives a split spring ring to prevent vertical movement therebetween. A key carried by the column and extending into a slot in the wall of the central aperture prevents the rotation of the column relative to the base.

A motor bracket having a vertical and two spaced horizontal bottom sections has apertures which slide upon the column containing a notch into which the rack carried by the column extends. Adjacent to the apertures provided on the motor bracket, an additional transverse aperture is provided for a shaft on which a pinion is mounted having teeth which mate with the teeth on the rack. A hub on the end of the shaft carried operating rods with balls on the ends which are grasped to rotate the hub and pinion and move the motor bracket upwardly and downwardly on the column. The downwardly extending portions of the motor bracket is spaced from the side wall of the base and extend downwardly along the side thereof and outwardly thereof to receive the forward end of a portable drill which is clamped thereto by a split collar disposed at the end of the bracket.

The base has a sleeve secured thereabove in which the power pack is mounted which includes a switch, the light, a diode and a receptacle for a plug which are interconnected and mounted on a nameplate which encloses the top of the sleeve. The switch is available in the circuit to the coil for controlling the magnetizing of the base and the receptacle provides current to the plug of the conductor on the portable drill unit. The base of the unit may be placed upon a magnetic workpiece to be drilled and retained thereon when the base is magnetic or a plate of magnetizable material may be furnished on which the base and the piece to be drilled is supported on opposite ends. This provides a convenient platform on which the drilling occurs when the base is magnetically attached to the plate.

DESCRIPTION OF THE PREFERRED EMBODIMENT

Figure 1:
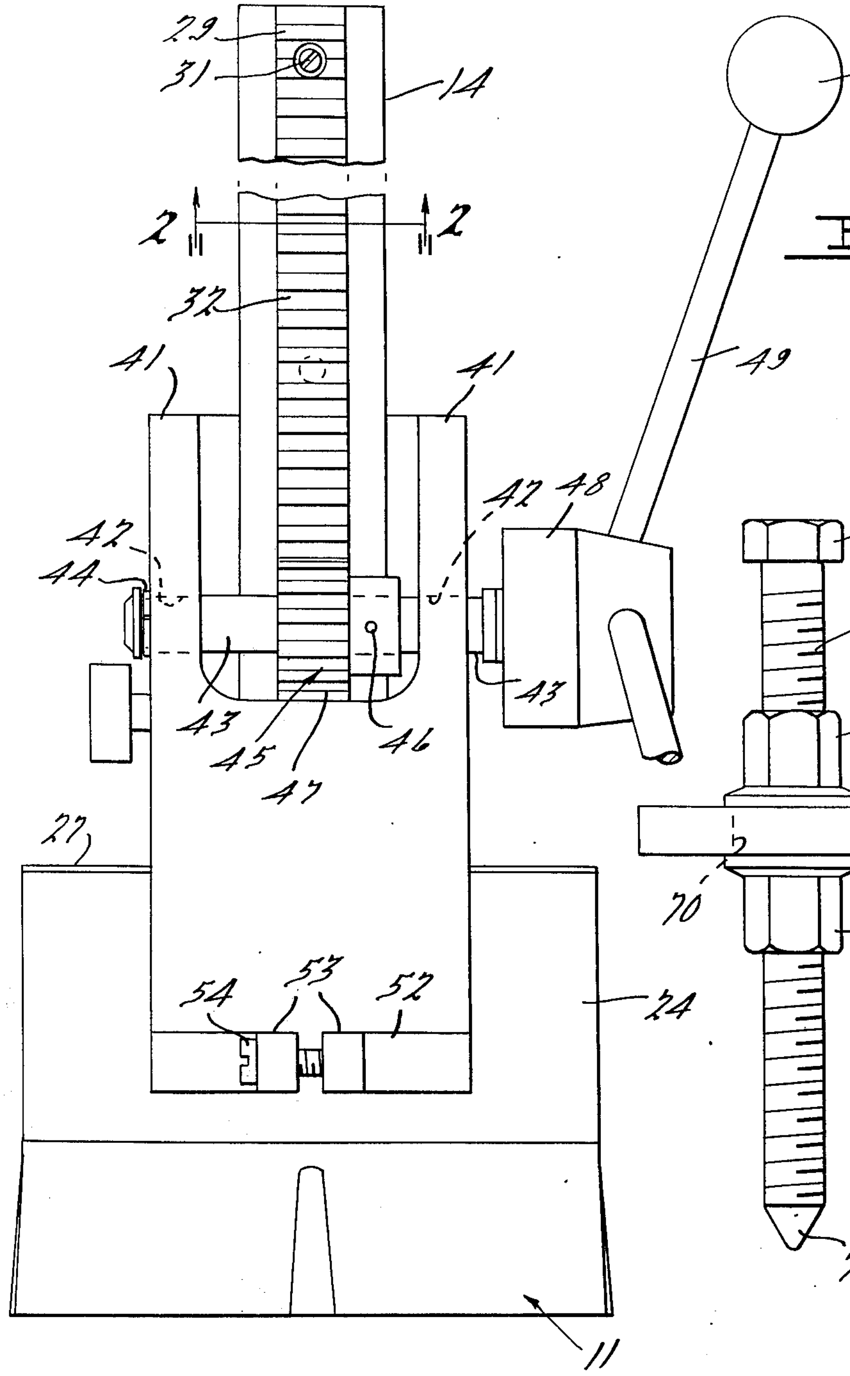
FIG. 1 is a broken view in elevation of a portable drill unit embodying features of the present invention.

Referring to the Figures, a base 11 is made from a magnetizable material such as iron and is herein illustrated as being circular although any other shape could be employed. The circular base has a central cylindrical aperture 12 and an annular recess 13 extending inwardly from the bottom of the base between the outer and the inner wall. A column 14 is a hollow tube having an outer ground surface and a bottom end 15 of smaller diameter providing a shoulder 16 which engages the top of the base when the bottom end 15 is inserted into the aperture 12. At the end of the column, an annular groove 17 is provided in which a split spring ring 18 is secured for retaining the end within the aperture against vertical movement. The column 14 has a D-shaped slot 19 therein containing a D-shaped key 21 which extends within a slot 22 disposed within the wal of the aperture 12 for securing the column against turning. The end of the bottom section 15 is provided with a chamfered end portion 23 which guides the end into the aperture 12.

Figure 2:
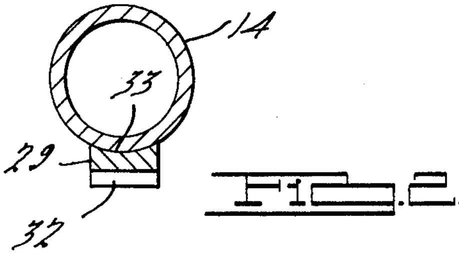
FIG. 2 is a sectional view of the structure illustrated in FIG. 1, taken on the line 2—2 thereof.
Figure 3:
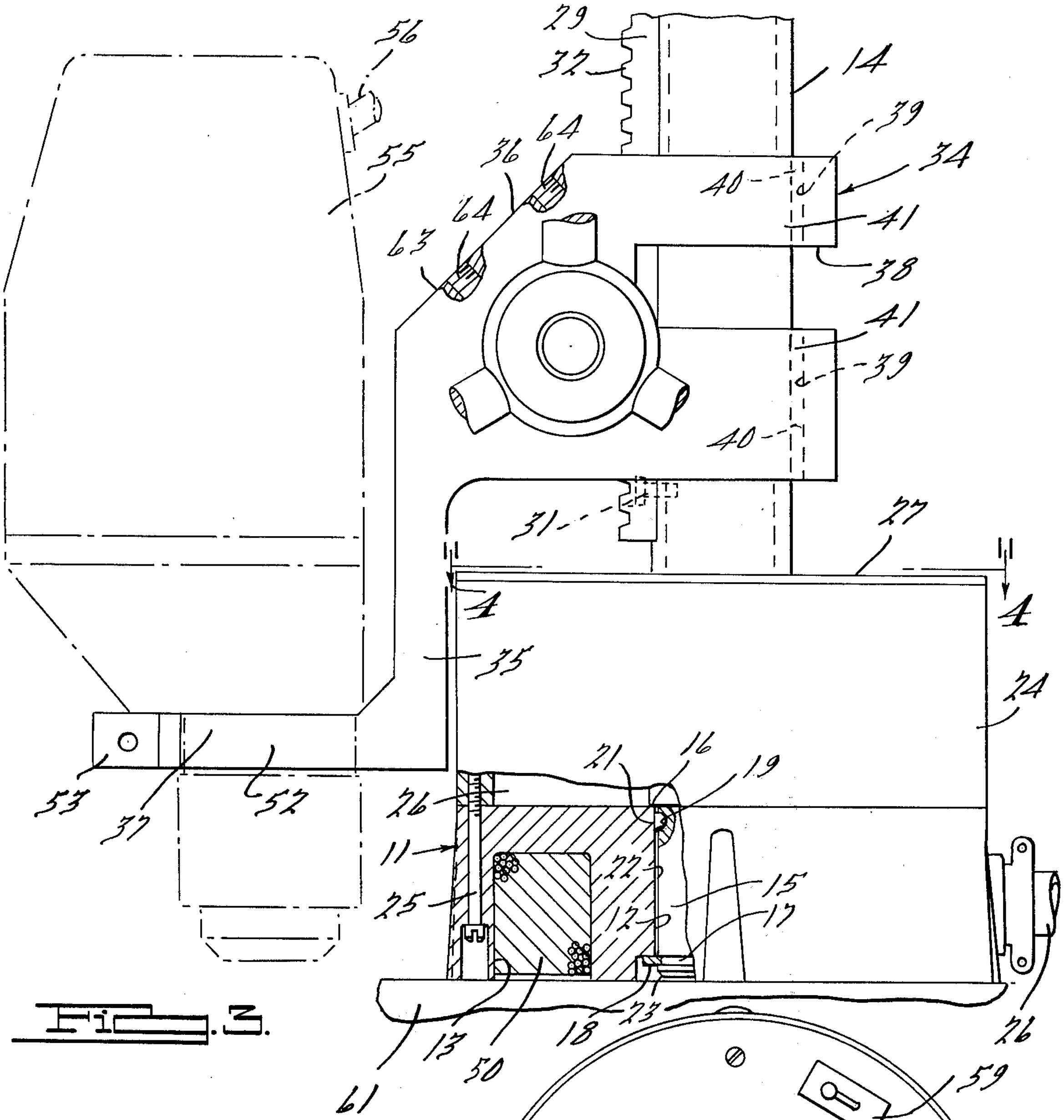
FIG. 3 is a broken side view of the structure illustrated in FIG. 1, with parts in section.
Figure 4:
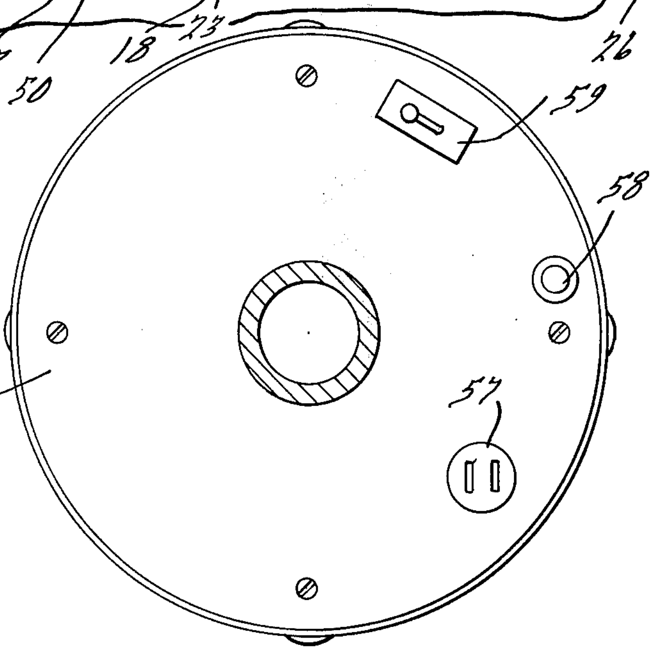
FIG. 4 is a sectional view of the structure illustrated in FIG. 3, taken on the line 4—4 thereof.

The base has a sleeve 24 secured on top thereof by a plurality of screws 25 to provide a hollow interior 26 which contains a power pack which among other things contains a switch, a light, a diode and a receptacle. The pack is wired together and to a service wire 26 extending through the base, as illustrated in FIG. 4. A nameplate in the nature of a disk 27 is secured to the top of the sleeve 24 by suitable screws 28 and support some elements of the pack to have the switch, light and receptacle available on the top thereof. The column 14 has a rack 29 secured thereto by a pair of screws 31, one at the top, the other at the bottom, as illustrated in FIGS. 1 and 3. As illustrated in FIG. 2, the rack 29 has a row of teeth 32 on the outer face and an arcuate face 33 on the opposite side which is struck from the same radius as that of the column for providing surface engagement therewith.

A motor bracket 34 has a central vertical section 35, an upper rearward section 36 and a lower forward section 37. The upper rearward section 36 has a central cut-out portion 38 with the upper and lower sections adjacent thereto provided with an aperture 39 containing cylindrical bearings 40 which engage the column 14 and the sides of the rack 29. The upper portion 36 is provided with spaced sections 41 containing apertures 42 for a shaft 43 and secured in position by a split ring 44. A pinion gear 45 is secured to the shaft 43 by a pin 46 with its teeth 47 in engagement with the teeth 32 of the rack. The end of the shaft is provided with a hub 48 having operating rods 49 extending therefrom with a ball 51 on the outer ends which are grasped when rotating the shaft 43. By pulling a ball 51 counterclockwise, the pinion gear 45 is rotated to provide an upper movement to the motor supporting bracket 34 to disengage the tool from the work after performing a machine operation. Referring more particularly to FIG. 3, the front section 37 of the motor bracket 34 has a collar 52 which is split at the outer end and provided with a pair of flanges 53 which are connected by a screw 54. A portable drill 55, shown in dot and dash line, has its lower end extending through the collar 52 and secured in fixed position therewith when the screw 54 is tightened to draw the adjacent ends close together. The motor has a supply conduit 56 of conventional form having a plug on the end which fits within a receptacle 57 mounted on the nameplate disk 27. This permits the portable drill to be removed from the drill stand and permits it to be used at a point remote therefrom. A pilot light 58 is mounted on the nameplate cover 27 for indicating the energization of the magnetic base and a switch 59 energizes a coil 50 which is mounted within the annular recess 13 of the base. When the switch 59 is thrown to "on" position, the coil 50 will be energized and a magnetic force provided in the base 11.

The drill unit is designed to be employed on a magnetizable material such as a channel, I-beam or the like in which a hole is to be drilled. The drill can be placed upon the surface with the base adjusted until the point of the drill is located at the point where drilling is to occur. By moving the switch 59 to "on" position the base will be energized and anchored to the surface by the resulting magnetic force. The hub is then rotated to move the drill supporting bracket downwardly and force is applied thereto to perform the drilling operation. After the drilling operation, the hub is reversely rotated to raise the drill from the work and by opening the switch 59 the magnetic force is interrupted and the drill unit may be removed to a new location. If the drill is to be employed on a bench, table or the like, a plate 61 of magnetic material may be used to receive the drill unit which is energized to fix the unit to the plate, the front portion of which extends beneath the drill and can be employed to support the workpiece during the drilling operation. Other means such as the securing elements illustrated in U.S. Pat. No. 3,791,755 assigned to the assignee of the present invention can be employed for fixing the stand relative to the workpiece which is to be drilled.

Figure 5:
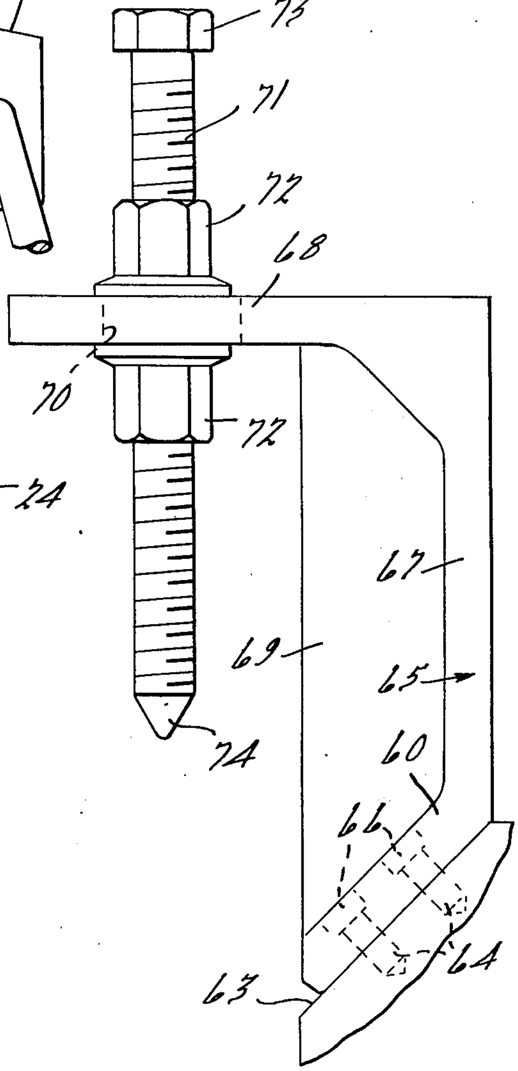
FIG. 5 is an attachable element which may be applied to the drill illustrated in the foregoing figures when an outboard support is required for the drill unit.

Referring to FIG. 5, the sloping wall 63 near the top of the section 36 which is provided with a pair of threaded apertures 64 may have a bracket 65 secured thereto by a pair of screws 66 which extend within the threaded apertures 64. The bracket 65 is C-shaped having a sloping bottom end 60, an upwardly extending vertical section 67 and a horizontal top section 68. The sections are reinforced by a central plate 69 all of which may be cast as a unit. The horizontal section 68 has an elongated slot 70 therein containing a screw 71 having nuts 72 thereon located on opposite sides of the horizontal section. The top end of the screw 71 has a hexagonal head 73 thereon and the bottom has a tapered end 74. With this arrangement, the screw 71 may be moved toward or away from the column 14 to have the tapered point 44 located in position to engage a tapered aperture at the top of the drill. When a larger drill than that illustrated in FIG. 4 is used, the bracket and screw will provide stability therefor so that the axis of the motor will be on the axis of the column and thereby accurately drill a hole in a workpiece. The threaded screw 71 need not be located on the centerline of the motor spindle but is available to engage the small central hole in the motor housing provided by the manufacture to properly locate the drill unit.

I claim:

1. In a portable drill press, a circular base having a central aperture, a column in said aperture extending upwardly from said base, means for securing the bottom of said column within said aperture, a sleeve substantially the diameter of said base secured thereabove in alignment therewith forming an area for elements to be carried therein, a motor bracket having a vertical central portion disposed along the side of said base and sleeve, an upper and lower portion at the top and bottom of the motor bracket extending therefrom in opposite direction and in unit relation therewith, said upper portion having aperture means which receives said column above said sleeve, a pinion carried by said upper portion, a rack having teeth on one side and a form on the opposite side which mates with a form on the column, said teeth engaged with the teeth of the pinion, a support on the lower portion of said motor bracket for supporting a drill unit, an annular recess extends within said base outwardly of said central aperture, a magnetic coil mounted in said recess to extend about the bottom of said column, and a washer-like disc the size of said sleeve for covering the top thereof with the column extending therethrough to form a support for elements mounted within the sleeve.

2. In a portable drill press, a circular base having a central aperture, a column in said aperture extending upwardly from said base, means for securing the bottom of said column within said aperture, a sleeve substantially the diameter of said base secured thereabove in alignment therewith forming an area for elements to be carried therein, a motor bracket having a vertical central portion disposed along the side of said base and sleeve, an upper and lower portion at the top and bottom of the motor bracket extending therefrom in opposite direction and in unit relation therewith, said upper portion having aperture means which receives said column above said sleeve, a pinion carried by said upper portion, a rack having teeth on one side and a form on the opposite side which mates with a form on the column, said teeth engaged with the teeth of the pinion, a support on the lower portion of said bracket for supporting a drill unit, an annular recess extending within said base outwardly of said central aperture, a magnetic coil mounted in said recess to extend about the bottom of said column, the base being of the magnetic type for retaining the drill in place on magnetizable material, and a plate to which said magnetic base is securable, said plate having an extending end located beneath the drill in position to operate on a workpiece supported on said extending end.

* * * * *